United States Patent [19]
Seigneur

[11] Patent Number: 5,056,224
[45] Date of Patent: Oct. 15, 1991

[54] TREE HARVESTER GUIDE BAR

[75] Inventor: Christopher D. Seigneur, West Linn, Oreg.

[73] Assignee: Blount, Inc., Portland, Oreg.

[21] Appl. No.: 639,676

[22] Filed: Jan. 7, 1991

[51] Int. Cl.[5] ........ B23D 59/04
[52] U.S. Cl. ........ 30/123.4; 30/382; 83/169; 144/34 R
[58] Field of Search ........ 144/34 R; 83/169, 795; 30/123.2, 123.4, 382, 383, 515

[56] References Cited

U.S. PATENT DOCUMENTS

| | | | |
|---|---|---|---|
| 2,605,787 | 8/1952 | Kickhaefere | 30/123.4 |
| 4,802,555 | 2/1989 | Matsunaga et al. | 30/123.4 |
| 4,884,340 | 12/1986 | Newman | 30/123.4 |
| 4,947,550 | 8/1990 | Wenzel | 30/123.4 |

FOREIGN PATENT DOCUMENTS

| | | | |
|---|---|---|---|
| 982908 | 12/1982 | U.S.S.R. | 30/123.4 |

*Primary Examiner*—W. Donald Bray
*Attorney, Agent, or Firm*—Robert L. Harrington

[57] ABSTRACT

A guide bar for a saw chain mounted to the boom of a tree harvester. As typical for such guide bars, oilhole holes are provided to receive oil for channeling of the oil to the edge grooves wherein the saw chain is entrained. Not typical of such guide bars is the provision of a pattern of inter-connecting oil channels in the bar for channeling oil to various positions on the bar edge including the bar edges adjacent each oil hole and at the bar nose. C-shaped valves in the oil holes are manually adjusted to control the flow of oil to the various positions.

7 Claims, 5 Drawing Sheets

TREE HARVESTER GUIDE BAR

FIELD OF THE INVENTION

This invention relates to a guide bar for guiding saw chain in a cutting operation and more particularly to a guide bar having controlled fluid flow for lubricating a saw chain driven around the guide bar.

BACKGROUND OF THE INVENTION

Guide bars used for mounting saw chain on mechanical tree harvesters are typically provided with an oil receiving hole and an inner channel that carries the oil from the hole to the bar edge groove. Saw chain entrained on the bar edge includes a center link tang that extends into the groove. Oil is picked up by the center link and centrifugal force spreads the oil over the various bearing surfaces (the tangs sliding in the groove, the links turning on the rivets, the relative sliding of the overlapping links).

The greatest need for the lubrication is at the outer or nose end of the bar and on that side edge of the bar where cutting takes place. A tree harvester bar normally cuts crossway through a standing tree and in the cutting operation has a leading edge and a trailing edge. Typically a saw chain travels from the drive sprocket at the pivot end of the bar along the trailing edge of the bar, around the bar nose and back to the drive sprocket along the leading edge of the bar. The cutting operation takes place along the leading edge of the bar where the chain is traveling from the bar nose at the outer or free end of the bar to the drive sprocket at the inner or pivot end of the bar.

The oil hole that receives the oil under pressure is located at the pivot end of the bar, adjacent the trailing edge. In a conventional bar, a channel directly conveys the oil from the oil hole to the bar edge groove, i.e., at the point where the chain begins its non-cutting travel along the trailing edge toward the nose. The oil is carried along the full reach of the bar before it is applied to the high pressure area at the nose and back along the leading edge where the cutting takes place.

The oil is centrifugally thrown from the bar continuously during the travel of the chain around the bar. Accordingly much of the oil is lost before it reaches the cutting area. In a subsequent development, the bar was improved by rerouting the channel and extending it lengthwise along the bar interior to the bar nose. The oil was thus applied at the beginning of the high pressure area and was far more efficiently utilized in the cutting operation.

However, tree harvesters are not always operated in the abovedescribed typical fashion. For example, trees are often harvested in the winter and in climates where the trees are laden with snow and ice. The typical operation results in the saw chain drawing snow from the tree trunk into the motor mount housing. This causes problems and the snow has to be frequently cleaned out of the housing. Thus, operators of tree harvesters in winter conditions will often reverse the direction of travel of the saw chain. They still cut along the leading edge of the bar but the chain travels in a direction from the drive sprocket to the nose along this leading edge. This helps keep the housing free of snow and ice. However, the oil deposited at the bar nose is carried from the bar nose to the drive sprocket, along the non-cutting trailing edge, around the drive sprocket and then to the leading edge whereat the cutting takes place. The highest area of wear is the last to receive the oil. Furthermore, tests have shown that the chain travelling around the drive sprocket throws off a high percentage of the oil and a relatively small amount remains on the chain to lubricate the leading cutting edge.

BRIEF DESCRIPTION OF THE INVENTION

The present invention alleviates the above problem of lubricating the bar and chain when the travel cycle of the chain is reversed. An oil channel is provided from the inlet hole directly to the trailing edge as in the original bar. A second channel is provided along the bar axis to the nose and an extension of the channel connects this second channel to the inlet hole. As is conventional practice, the bar is symmetrical and reversible. Thus, a second or alternate inlet hole is provided at the opposite edge and a further extension of the second channel connects this second channel to the alternate inlet hole. As in the first inlet hole, a channel is provided from the alternate inlet hole directly to the bar groove at this opposite edge.

It will be understood that the alternate inlet hole functions only as an oil inlet in the case where the bar is reversed, i.e., when that edge becomes the leading edge. Otherwise, the chain saw housing, in the conventional manner, closes this hole. In the case of the prior art guide bars, the inlet hole positioned at the leading or cutting edge is non-functional.

In the preferred embodiment of the present invention there are three positions on the bar where oil may be deposited, i.e., at each of the leading and trailing sides at the inner end of the bar, and at the nose of the bar. Whereas it is not generally desirable to deposit oil at all three positions, a simple flow control valve is provided at both inlet holes. The valves are independently manually adjustable and as desired can be adjusted to permit oil flow to the leading edge only, to the bar nose only, to the bar nose and opposite edge, or to all three.

Numerous modifications are available to further expand on the pattern of oil flow to the saw chain travelling on the bar edge. The invention and such further modifications will be more fully appreciated by referring to the detailed description and the drawings referred to therein.

DETAILED DESCRIPTION

Figure 1:
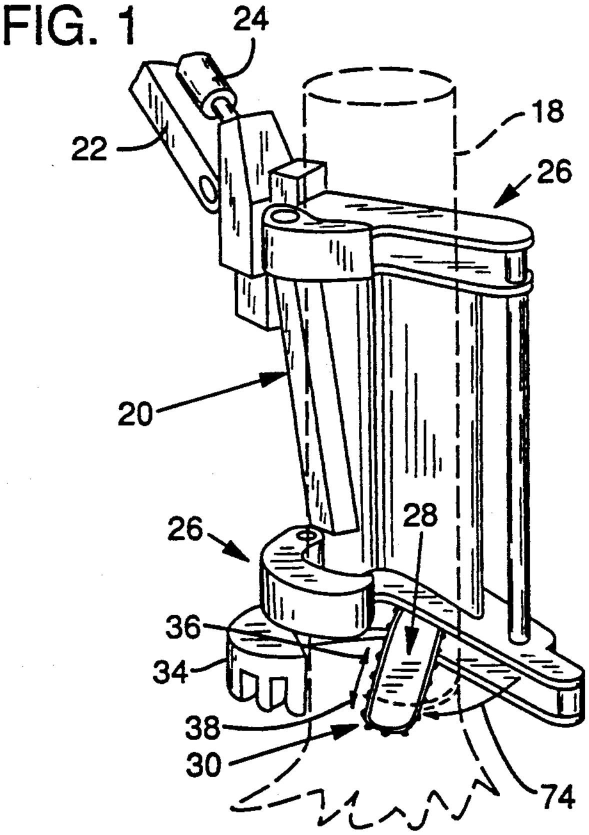
FIG. 1 illustrates a chain saw bar in accordance with the present invention mounted on a tree harvesting machine.

FIG. 1 illustrates the chain saw portion of a tree harvester. As typical of tree harvesters, a mast 20 mounted on the end of a boom 22 is maneuvered by various hydraulic cylinders 24 to position grapples 26 around a standing tree 18. A chain saw guide bar 28 and saw chain 30 entrained thereon, is mounted to the mast 20 for pivoting the bar and chain out of its protective guard 32 and toward an anvil 34 on the opposite side of the tree.

The saw chain typically travels in a direction on the leading bar edge (the cutting edge) as indicated by arrow head 36 and heretofore oiling of the chain and bar have been provided to primarily accommodate cutting in direction 36. However, the needs of the tree harvester operator dictate a preference at times for running the chain in the opposite direction, i.e., as indicated by arrow head 38. The present invention provides alternate oil flow patterns to accommodate either direction of cutting.

Figure 2:
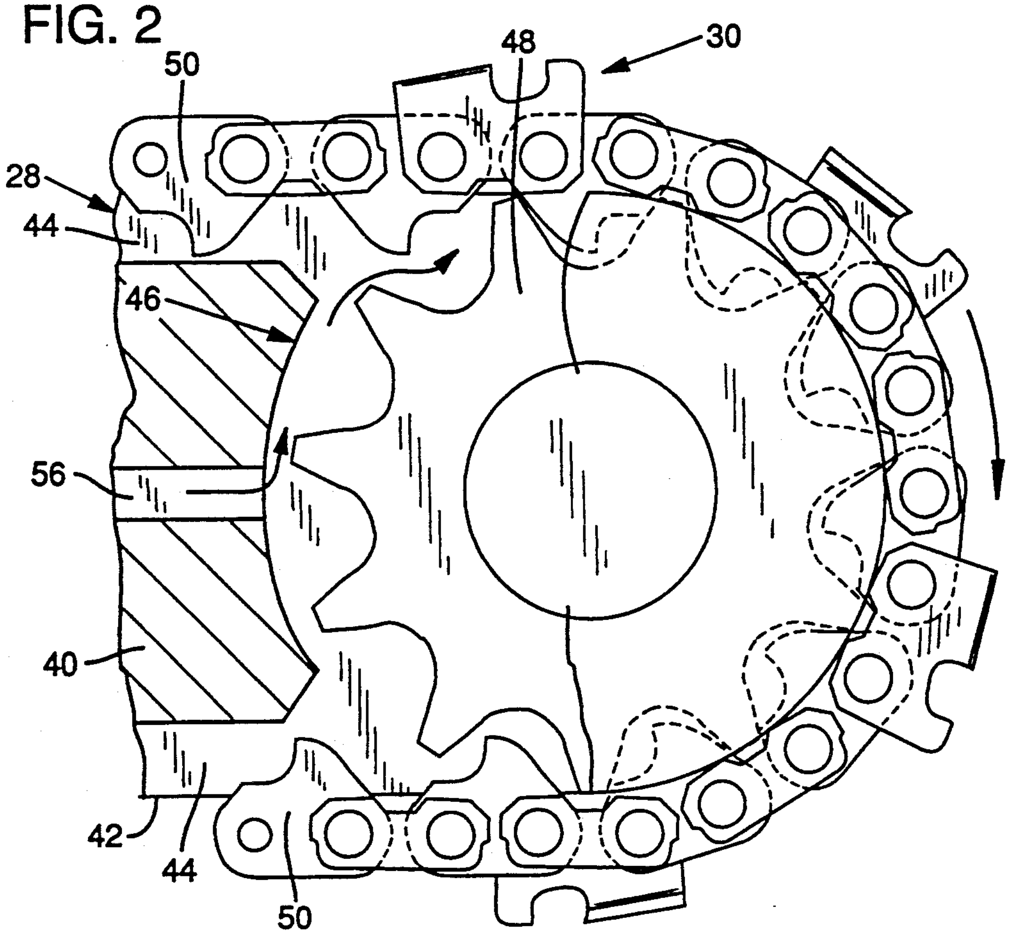
FIG. 2 is a view of the nose end of the bar of FIG. 1 shown partially in section.
Figure 3:
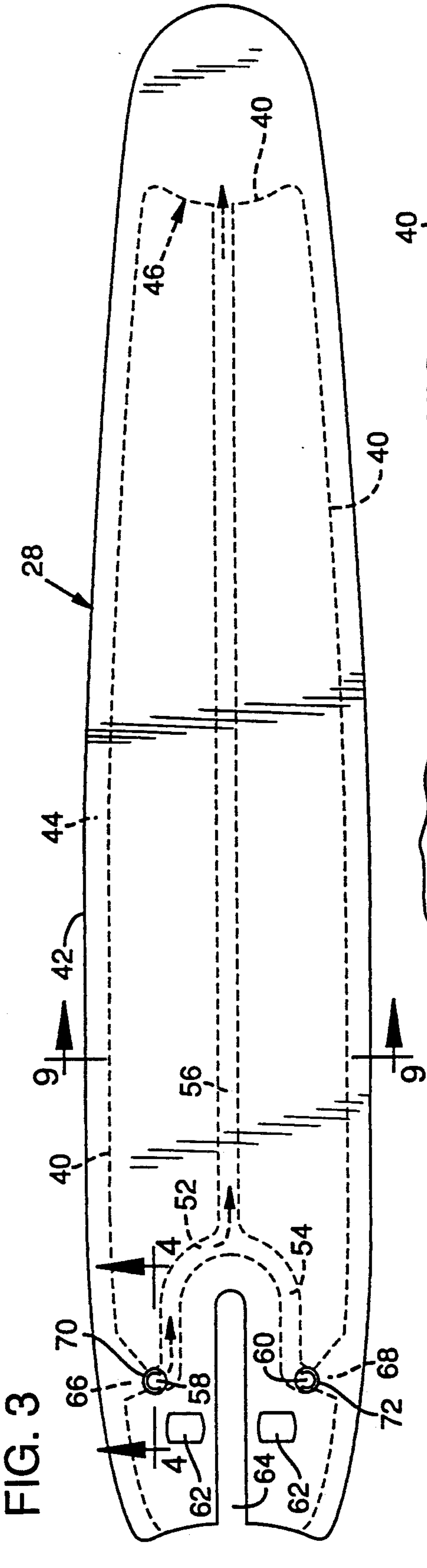
FIG. 3 illustrates the guide bar in plan view and detached from the machine.
Figure 9:
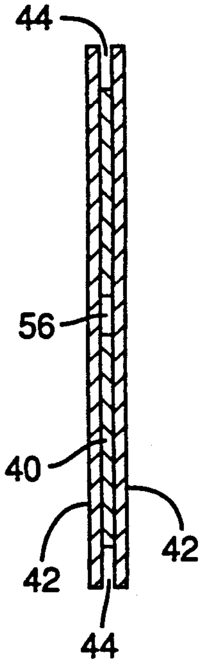
FIG. 9 is a section view as taken on view lines 9—9 of FIGS. and 8.

Reference is made to FIGS. 2, 3 and 9. In FIG. 3, the guide bar 28 is illustrated in side view and by itself, i.e., not mounted to the harvester machine and not carrying the saw chain. FIG. 9 is a cross section of FIG. 3 where it will be noted that the bar thickness is made up of three laminates. A center laminate 40 is sandwiched between two identical outer laminates 42. The laminates are bonded together, e.g. by welding.

From FIGS. 3 and 9, it will be seen that the center laminate 40 is dimensionally smaller in length and width than the outer laminates (shown in dash lines in FIG. 3) to provide grooves 44 at the side edges and a receiving slot 46 at the nose end for the nose sprocket. FIG. 2 illustrates the nose end of the bar with the nose sprocket 48 mounted in the slot 46 (a portion of the outer laminate 42 having been removed), and the chain 30 mounted to the bar edge and illustrating the tang 50 of the saw chain entrained in the groove 44.

As most clearly shown in FIG. 3, oil inlet holes 58, 60 extend through the bar thickness and oil carrying channels 52, 54 and 56 are formed in the center laminate leading to and from the holes. The holes are provided at the rear end, whereat the bar is mounted to the mast 20. As is typical for injecting oil to the bar on a harvester or chain saw, the holes are shrouded by the motor mount housing. By design, only one side of one hole, (e.g. hole 58) is injected with oil under pressure from an oil source. The opposite side of the hole is closed off as are both sides of the other hole, (e.g. hole 60).

Figure 7:
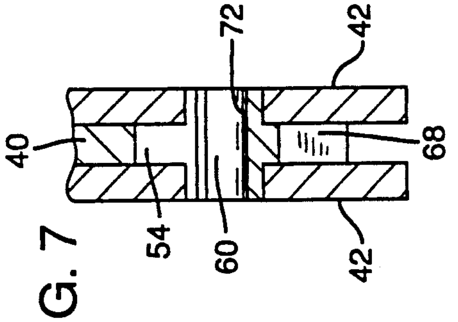
FIG. 7 is a section view as taken on view lines 7—7 of FIG.
Figure 6:
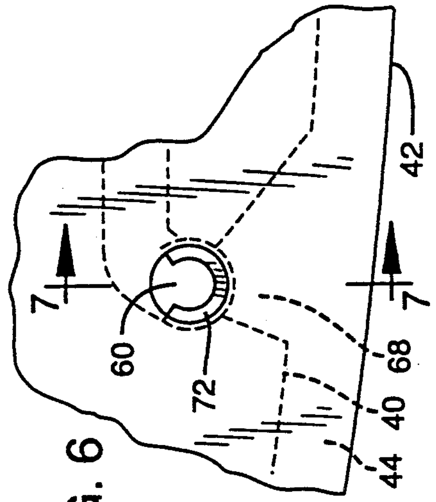
FIG. 6 is an enlarged partial view of one of the oil inlet holes and valves therein.

As will be apparent from FIGS. 3, 6 and 7, the edges of the center laminate adjacent the holes 58 and 60 are notched to provide channels 66, 68 and thereby direct flow of oil to the groove 44. Channel 52 formed in the center laminate extends from hole 58, curves around slot 64 and interconnects with center channel 56, as does channel 54 from hole 60. Channel 56 extends from its interconnection with channels 52, 54 along the length of the center laminate to open into the sprocket receiving slot 46.

Figure 8:
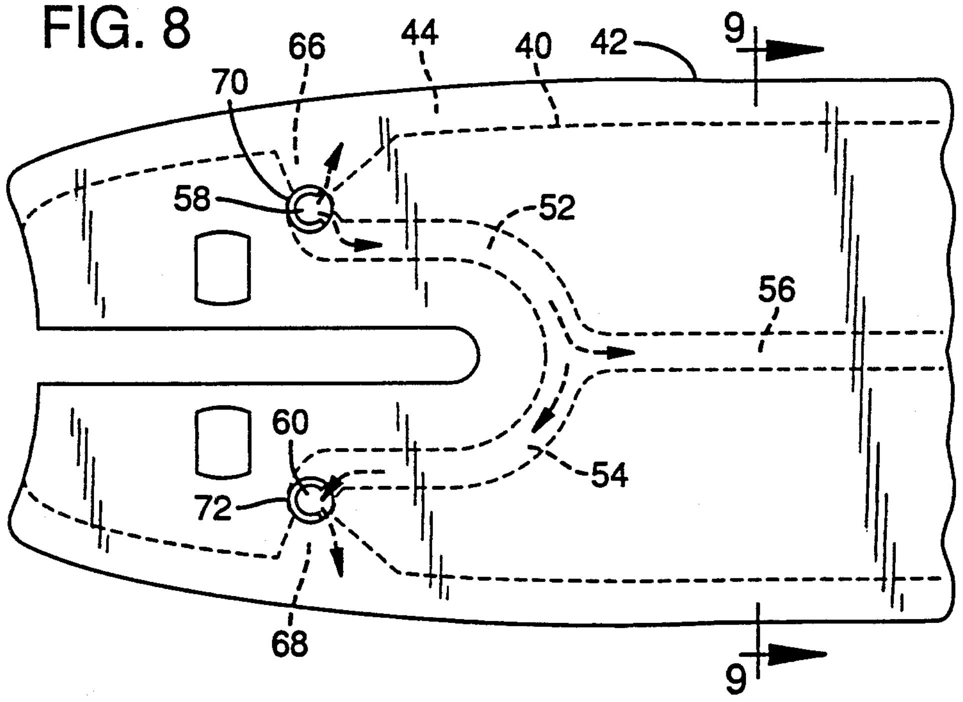
FIG. 8 shows an alternate flow pattern derived by changing the setting of the flow control valves.
Figure 10:
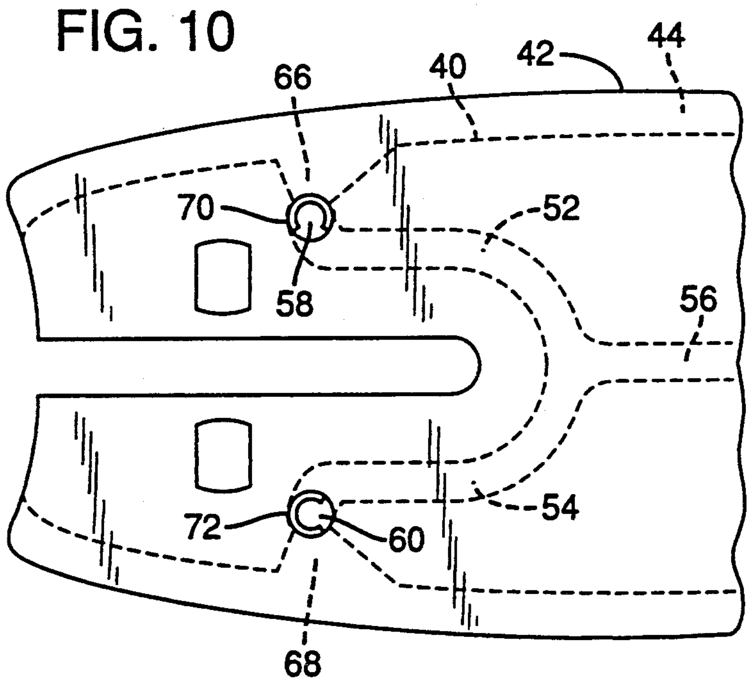
FIG. 10 is a view similar to FIG. 8 with different valve settings.

Mounted in the holes 58, 60 are similar C-shaped control valves 70, 72 (see FIGS. 3 and 6 and section views 4 and 7). The valves 70, 72 can be rotated with a tool, e.g. a screwdriver, to position the open side of the C-valve as desired. It will be apparent that oil that is injected into the one side of the hole (58 or 60) is thereafter directed out of the hole through the open side of the C-valve. FIGS. 3, 8 and 10 illustrate the C-valves 58, 60 in different positions for directing oil flow through different channels to the bar edge. In these figures it will be assumed that the bar is mounted so that hole 58 is adjacent the trailing edge and hole 60 is adjacent the leading edge.

In FIG. 3, both C-valves 58, 60 are set with the openings inward to channels 52, 54, thereby closing oil flow to channels 66 and 68. Thus, oil injected into hole 58 is directed as indicated by the directional arrows, through channel 52 (it fills channel 54 but is otherwise blocked) and flows into channel 56. As seen from the directional arrow in FIG. 2, the oil from channel 56 is picked up by the teeth of the nose sprocket 48 and deposited for pick up by the saw chain 30. In FIG. 2 the chain is mounted for cutting in the conventional manner, i.e., while moving in a direction from the nose sprocket toward the pivotal end as indicated by arrow head 36 in FIG. 1. This coincides with the setting of the valves in FIG. 3 with oil deposited on the chain at the beginning of its cutting run.

Referring to FIG. 8, the C-shaped valves are both adjusted to allow oil to flow in both directions. Oil injected into hole 58 is permitted by valve 70 to flow both directly into the groove 44 through channel 66 and toward channels 56 and 54 through channel 52. Oil flow into channel 54 is not blocked and thus flows past valve 72 and through channel 68 into groove 44. (This setting would be an all purpose setting to accommodate either direction of cutting.)

FIG. 10 illustrates the valve 70 turned to close oil flow directly to groove 44 while providing full flow to channels 52, 54 and 56. Valve 72 is open to both channels 54 and 68 so that oil flows both to the nose and to the leading or cutting edge adjacent the motor mount. (This setting would likely be desirable for reversal of the chain, i.e., with the cutting chain moving in a cutting direction from the pivotal end toward the nose end).

It will be appreciated that the bar 28 is substantially symmetrical and can be reversed or inverted to position hole 60 at the oil injection position. Inversion of the bar is important to extend the life of the bar. Where cutting takes place along the forwardly directed edge of the bar, that edge becomes worn at a far greater rate than the trailing edge. Reversing the bar edges enables both edges to be utilized to their full life.

From the above, it will be understood that the valve setting of FIG. 3 is most desirable for conventional cutting that is common where snow and ice is not a factor. Valve setting of FIG. 10 is most desirable when the cutting chain is reversed as when cutting trees that are coated with snow or ice. In this instance, the chain will carry the snow and other debris toward the nose end rather than into the motor mount housing.

FIG. 8 is intended to illustrate the versatility of the valve settings. There are other settings as well. For example, the valve in the oil inlet hole 58 can be opened fully to channel 66 and thus directly into the bar groove. It is thus closed to the channels 52, 54, 56 and 68. In this instance the oil travels first along the full length of the non-cutting edge, then to the nose, and then to the cutting edge. This is the original flow pattern and may be desired by some operators of tree harvesters. The valve settings are available to accommodate whatever the operator desires. Furthermore, it will accommodate changes in the design of the machine, e.g. where oil is injected to the oil hole at the leading edge rather than at the trailing edge as is the common practice today.

Figure 4:
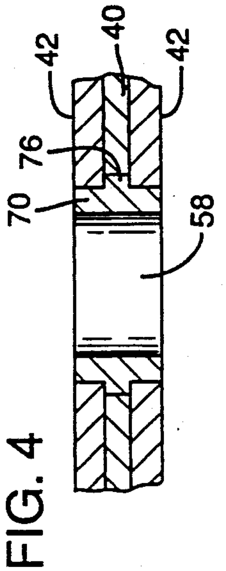
FIG. 4 is a section view taken on view lines 4—4 of FIG. 3.

Reference is now made to FIG. 4 which as noted from FIG. 3 is a section view of valve 70 and oil hole 58. As will be noted, the valve exterior includes a flange 76 that projects into an inset of the center laminate 40. Laminates 42 overlap the flange 76 and trap the valve to eliminate any likelihood of displacement.

Figure 5:
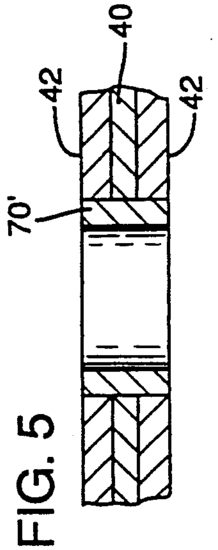
FIG. 5 is a view similar to that of FIG. 4 but having alternate construction.

FIG. 5 is an alternate construction of the valve referenced as 70'. Valve 70' is simply press fit into the oil hole. However, the valve body is formed of a spring-like material (e.g. spring steel) that urges opening of the spring and thus frictionally grips the side of the opening. The pressure is not so great as to prevent turning, e.g. with a screwdriver, but is sufficient to prevent displacement due to typical operating vibrations.

ALTERNATE FLOW PATTERN EMBODIMENTS

Figure 11:
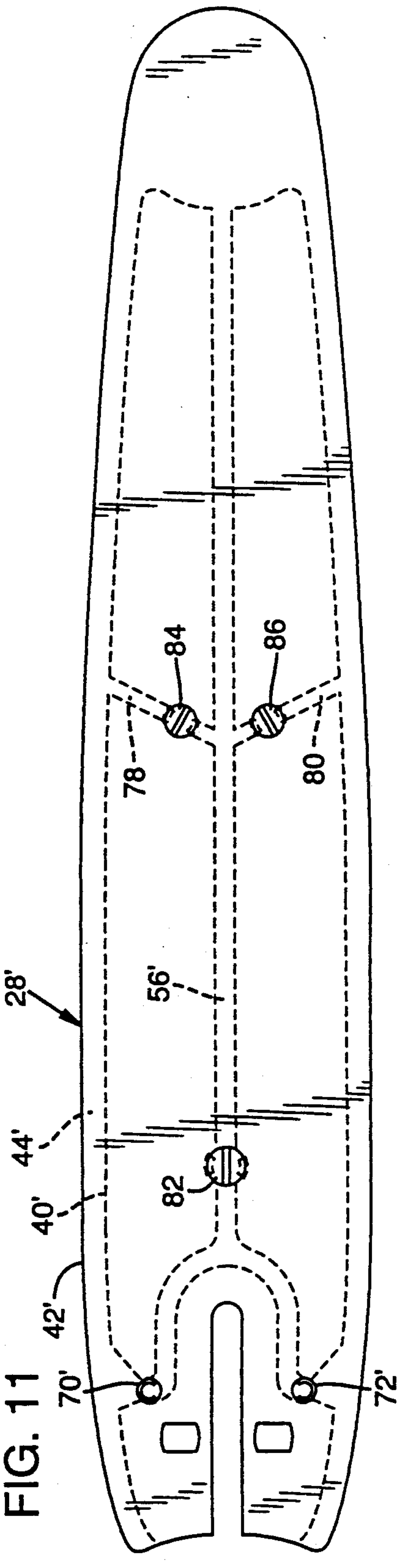
FIG. 11 is an alternate embodiment of the invention having additional oil channels and valves controlling flow of oil through the channels.
Figure 13:
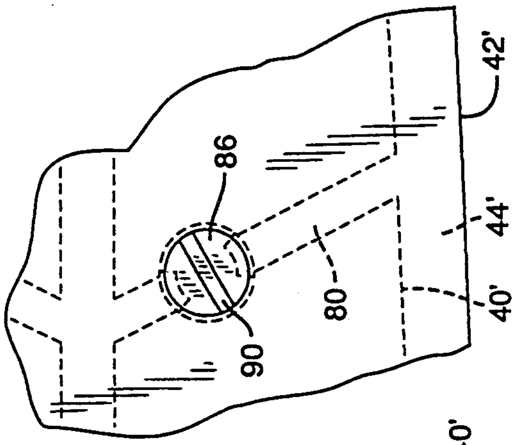
FIGS. 12 and 13 illustrate alternate settings of the additional valves of FIG. 11.
Figure 15:
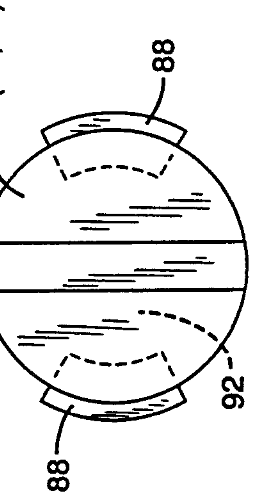
FIG. 15 is a view of the valve only of the embodiment of FIG. 11.
Figure 14:
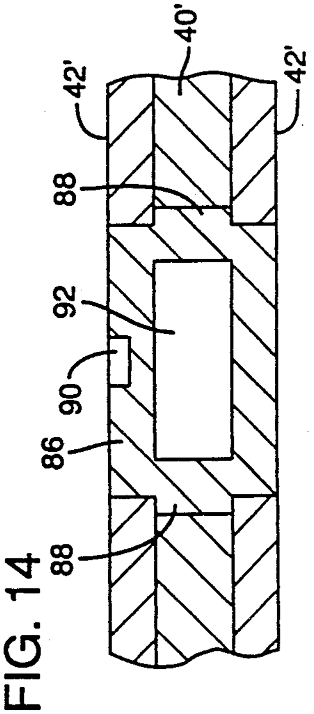
FIG. 14 is a section view as viewed on section lines 14—14 of FIG. 12.
Figure 12:
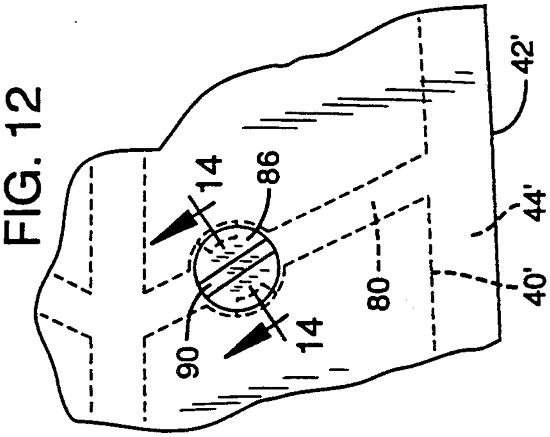

Reference is now made to FIGS. 11-15. The bar as illustrated in FIG. 11 is similar to the bar of FIG. 3 and the similar parts are designated with the same reference number but adding a prime, i.e., the center groove is 56'. The difference between FIG. 3 and FIG. 11 is that in FIG. 11 two additional channels 78, 80 are formed in the center laminate 40' intermediate the ends of the bar. Also, three additional valves 82, 84, 86 are provided for controlling flow through the channels 56', 78 and 80. FIGS. 14 and 15 illustrate these valves. Flanges 88 function to trap the valve between the outer laminates 42'. A groove 90 in the outside or top of the valve enables an operator to turn the valve, e.g. with a tool such as a screwdriver. It also indicates the direction of the flow through bore 92. As seen in FIG. 12, with the slot 90 lined up with the channel 80, oil will flow through the bore 92 and to the bar edge groove 44'. In FIG. 13, the slot 90 is crossway to the channel 80 and oil is blocked by flanges 88 from flowing to the bar edge groove.

With reference to FIG. 11, it will be observed that valves 70'and 72' are open inwardly, channels 66' 68' being closed, so that all of the oil through the oil inlet hole 58' is directed to the center channel 56'. Valve 82 is open allowing oil to flow down channel 56' whereas valves 84, 86 are closed so that all of the oil is channeled to the bar nose. Numerous variations are possible with variations in the valve settings which will be apparent to those skilled in the art.

Figure 16:
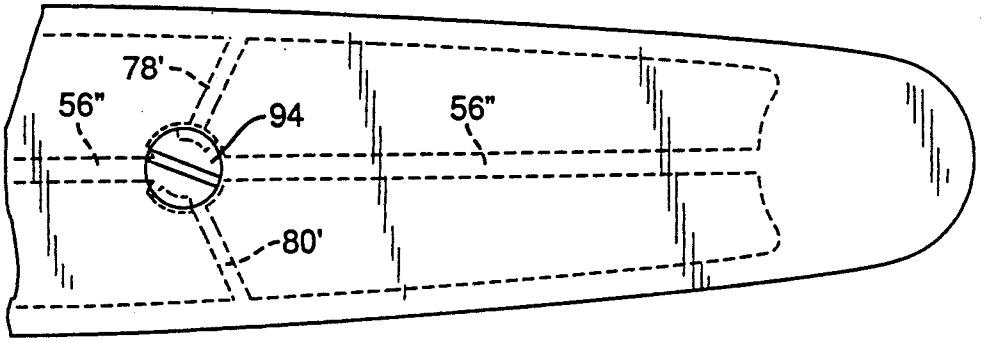
FIGS. 16, 17, 18 and 19 are views of further embodiments of the invention.
Figure 17:
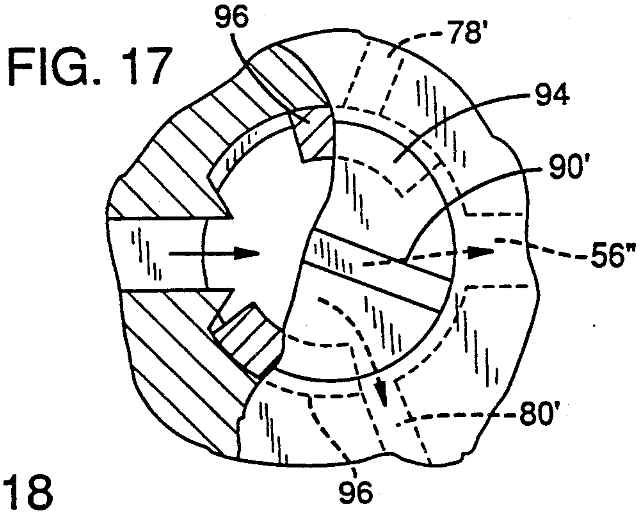

Reference is now made to FIGS. 16 and 17 which illustrate a different type of valve. Valve 94 is positioned at the juncture of channels 56'', 78' and 80'. Flanges 96 are located to block flow of oil around the valve. By positioning the slot 90' as shown in FIG. 17, oil will flow through bore 92' to both channels 80' and 56'' as indicated by arrows. It will be appreciated that adjustment of the valve will also achieve flow only to channel 56'' or flow only to both channels 56'' and 78'. This design is safeguarded to prevent blockage of oil through the valve to the nose channel 56''.

Figure 18:
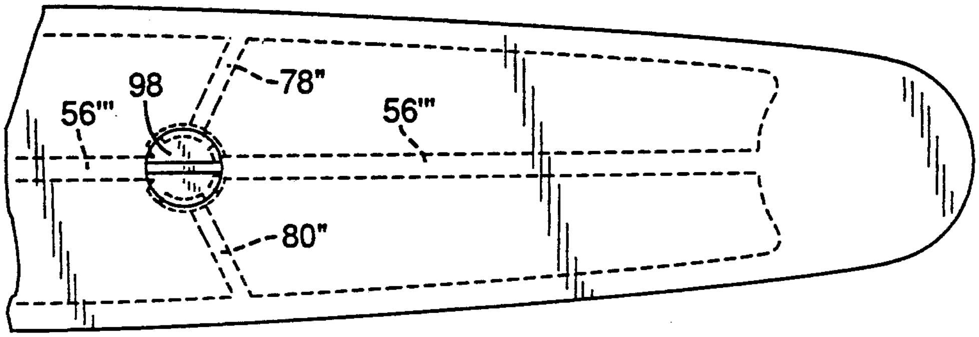
Figure 19:
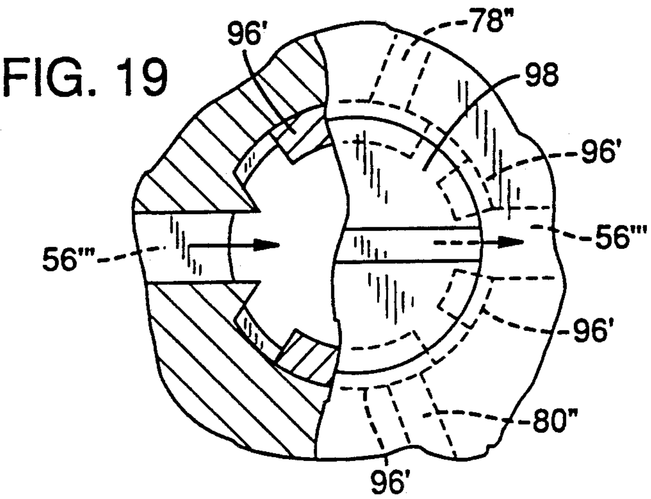

The valve 98 of FIGS. 18 and 19 is a further modification of the valve illustrated in FIG. 17. It provides for one-way flow only with flanges 96' situated on the valve 96 to provide flow through bore 92'' to any one of the channels 56''', 78'' or 80''. FIG. 19 is in the position of flow only to channel 56'''.

It will be recognized that the valves and channels will allow fluids, other than oil, to be routed to selected positions of the guide groove. For example, it can be used on the bars of masonry and stone saws for controlling the flow of water to the guide edges for flushing, lubricating and cooling the saw chain driven around the bar groove.

These and other modifications will become apparent to those skilled in the art. The invention is accordingly determined by reference to the claims appended hereto.

What is claimed is:

1. A guide bar for guiding a driven saw chain comprising;

a planar elongate bar having one end adapted to be mounted to a motor mount, an opposite nose end, and side edges extended between said ends, edge grooves formed in the side edges and around the nose end for guiding a saw chain from one side edge adjacent the motor mount end toward and around the nose end and back along the opposite side edge to the motor mount end, said bar having a fluid inlet hole adjacent said motor mount end for receiving fluid injected into the hole from a fluid source, a plurality of fluid carrying channels provided within the elongate bar and in communication with said fluid inlet hole and in communication with said edge grooves at a plurality of positions along said edge grooves, said plurality of channels having a common juncture wherein fluid is received and disbursed to said channels, and a valve in said juncture, said valve being adjustable for selectively controlling the flow of fluid to said channels.

2. A guide bar as defined in claim 1 wherein said plurality of channels includes one of said channels extending from said fluid hole to the edge groove of said one edge adjacent said motor mount end, and a bar nose channel extending from said fluid hole to the bar nose.

3. A guide bar as defined in claim 2 wherein said fluid hole is located adjacent said one edge and a second fluid hole located adjacent said opposite edge, said fluid holes symmetrically located relative to the bar center line whereby the bar edges can be reversed on the motor mount housing, a second set of channels extending from said second fluid hole, one channel of the second set of channels extending to the opposite bar edge and a second channel of the second set of channels extending to merge with the bar nose channel, and a second valve in said second fluid hole to selectively control fluid flow to and from said fluid hole through said second set of channels.

4. A guide bar as defined in claim 3 wherein the merging of the second channel with the bar nose channel forms a juncture, a third valve provided in the bar nose channel at a position beyond said juncture, said third valve selectively and manually opening and closing fluid flow through the bar nose channel.

5. A guide bar as defined in claim 4 including intermediate channels extending from said bar nose channel to the bar edges intermediate the bar nose and motor mount ends, said intermediate channels forming a juncture with said bar nose channel, and said third valve positioned at said juncture to control fluid flow through said bar nose channel and intermediate channels.

6. A guide bar as defined in claim 2 wherein said valve is a C-shaped valve positioned in said fluid hole, said C-shaped valve being manually rotatable in said fluid hole to position the open side of the C-shaped valve selectively to close and open flow of fluid to said channels.

7. A guide bar as defined in claim 3 wherein both of said valves are C-shaped valves positioned in said fluid holes, said C-shaped valves being manually rotatable in said fluid holes to position the open side of the C-shaped valves selectively to close and open flow of fluid to said channels.

* * * * *